United States Patent
Tanno et al.

(10) Patent No.: US 7,782,426 B2
(45) Date of Patent: Aug. 24, 2010

(54) LIQUID CRYSTAL DISPLAY DEVICE

(75) Inventors: Junji Tanno, Chiba (JP); Masateru Morimoto, Mobara (JP); Tohru Sasaki, Mobara (JP)

(73) Assignees: IPS Alpha Technology, Ltd., Chiba (JP); Hitachi Displays, Ltd., Chiba (JP)

( * ) Notice: Subject to any disclaimer, the term of this patent is extended or adjusted under 35 U.S.C. 154(b) by 161 days.

(21) Appl. No.: 12/289,183

(22) Filed: Oct. 22, 2008

(65) Prior Publication Data

US 2009/0103025 A1    Apr. 23, 2009

(30) Foreign Application Priority Data

Oct. 22, 2007    (JP)    ............... 2007-273708

(51) Int. Cl.
  *G02F 1/1343*    (2006.01)
  *G02F 1/1335*    (2006.01)
(52) U.S. Cl. ...................... 349/110; 349/141
(58) Field of Classification Search ............... 349/141, 349/104, 106, 122, 123, 139, 138, 142, 39, 349/110
  See application file for complete search history.

(56) References Cited

U.S. PATENT DOCUMENTS

| | | | | |
|---|---|---|---|---|
| 6,583,840 | B1 * | 6/2003 | Inoue et al. | 349/141 |
| 6,587,173 | B2 * | 7/2003 | Yoo et al. | 349/129 |
| 6,747,712 | B2 | 6/2004 | Noh et al. | 349/39 |
| 7,009,206 | B2 | 3/2006 | Lee et al. | 257/72 |
| 7,199,852 | B1 * | 4/2007 | Lu et al. | 349/141 |
| 7,414,690 | B1 * | 8/2008 | Lu et al. | 349/141 |
| 2005/0264744 | A1 | 12/2005 | Kim et al. | 349/141 |
| 2009/0103025 | A1 * | 4/2009 | Tanno et al. | 349/110 |
| 2009/0279036 | A1 * | 11/2009 | Kim et al. | 349/139 |

FOREIGN PATENT DOCUMENTS

| JP | 2003-21845 | 5/2002 | ............ 349/141 X |
|---|---|---|---|
| JP | 2004-361949 | 5/2004 | ............ 349/141 X |
| JP | 2005-346064 | 5/2005 | ............ 349/141 X |

* cited by examiner

*Primary Examiner*—Brian M Healy
(74) *Attorney, Agent, or Firm*—Stites & Harbison, PLLC; Juan Carlos A. Marquez, Esq

(57) ABSTRACT

The present invention realizes an IPS liquid crystal display device which exhibits small directivity of viewing angle and high brightness. Below a pixel electrode having a comb-teeth-shaped electrode and having a laterally-extending trapezoidal profile, a planar common electrode not shown in the drawing is formed by way of an insulation film. When a video signal is applied to the pixel electrode, an electric field is generated between the pixel electrode and the common electrode via slit portions formed in the pixel electrode thus controlling liquid crystal molecules. The pixel electrodes are arranged in a packed state by alternately reversing the direction of the trapezoidal shape in the longitudinal direction. Since a light blocking film is not present between two pixel electrodes arranged adjacent to each other in the longitudinal direction, the liquid crystal display device can acquire high transmissivity. As a result, a liquid crystal display device having high brightness can be realized.

16 Claims, 11 Drawing Sheets

LIQUID CRYSTAL DISPLAY DEVICE

The present application claims priority from Japanese application JP2007-273708 filed on Oct. 22, 2007, the content of which is hereby incorporated by reference into this application.

BACKGROUND OF THE INVENTION

1. Field of the Invention

The present invention relates to a liquid crystal display device, and more particular to a lateral-electric-field liquid crystal display device which exhibits excellent viewing angle characteristic and brightness characteristic.

2. Background Art

A liquid crystal display device includes a TFT substrate on which pixel electrodes, thin film transistors (TFT) and the like are formed in a matrix array and a counter substrate which faces the TFT substrate in an opposed manner and forms color filters or the like thereon at places corresponding to the pixel electrodes, and liquid crystal is sandwiched between the TFT substrate and the counter substrate. Further, an image is formed by controlling transmissivity of light for every pixel by driving liquid crystal molecules.

Viewing angle characteristic is important in the liquid crystal display device. The viewing angle characteristic is a phenomenon that brightness is changed or chromaticity is changed between a case where a screen is observed from a front side and a case where the screen is observed in the oblique direction. With respect to the viewing angle characteristic, an IPS (In Plane Switching) liquid crystal display device which operates liquid crystal molecules using an electric field which contains electric-field components in the horizontal direction exhibits excellent viewing angle characteristic.

Although the IPS liquid crystal display device exhibits the excellent viewing angle characteristic compared to a liquid crystal display device which adopts other liquid crystal driving method, the viewing angle characteristic of the IPS liquid crystal display device is less than optimal. For example, between a case where a screen is observed from one direction and a case where the screen is observed from other direction, the tone of color is delicately changed. Although a change of the tone of color is smaller than a change of the tone of color observed in a liquid crystal display device which adopts other liquid crystal drive method, there still exists a room for improvement with respect to the tone of color of the IPS liquid crystal display device. JP-A-2005-346064 (corresponding US patent application US2005/0264744 A1) (patent document 1) discloses the constitution where the directivity of viewing angle characteristic is improved by forming a pixel in a trapezoidal shape and by providing a region where the direction of a pixel electrode and the direction of a common electrode differ from each other in one pixel.

In the IPS liquid crystal display device disclosed in patent document 1, the pixel electrodes and the common electrodes are formed on the substantially same plane on a TFT substrate. Accordingly, transmissivity of light from a backlight on the TFT substrate, that is, brightness of screen becomes important.

An IPS liquid crystal display device disclosed in JP-A-2004-361949 (corresponding U.S. Pat. No. 7,009,206) (patent document 2) adopts the constitution where trapezoidal pixels are arranged in a row by changing the direction of a trapezoidal shape also in the lateral direction. In patent document 2, the pixels are defined by video signal lines and bent scanning lines. The scanning lines are bent to allow the scanning lines to conform with the trapezoidal pixels. Further, in patent document 2, a capacitive line extends at the center of the pixel. The technique disclosed in patent document 2 is substantially equal to the technique disclosed in patent document 1 with respect to a point that the pixel electrodes and the common electrodes are formed on the substantially same plane on a TFT substrate. Further, the technique disclosed in patent document 2 is disadvantageous in transmissivity with respect to a point that the capacitive line extends at the center of the pixel.

As the constitution which increases transmissivity in an IPS liquid crystal display device, the constitution disclosed in JP-A-2003-21845 (corresponding U.S. Pat. No. 6,747,712) (patent document 3) is named. In this constitution, the pixel electrodes and the common electrodes are formed in different layers, and the common electrode is formed of a planar electrode. The pixel electrode is formed in a comb-teeth shape with a closed distal end, and an image is formed by controlling liquid crystal molecules using an electric field generated by the potential difference between the comb-teeth-shaped electrode and the common electrode. With the use of a transparent electrode as the pixel electrode and the common electrode, transmissivity is largely increased.

Patent document 3 discloses the constitution where the pixels are defined by capacitive lines (common lines) and video signal lines, and a scanning line is arranged at the center of the pixel. Also in such an IPS liquid crystal display device, due to the presence of the capacitive lines for forming capacitances, transmissivity is lowered.

SUMMARY OF THE INVENTION

In the technique disclosed in patent document 1, the pixel is formed in a region surrounded by video signal lines and scanning lines. Further, the scanning lines are also inclined in conformity with the inclination of the pixel electrodes or common electrodes. However, even when the scanning line is inclined, a fact that a region which does not contribute to a display is increased in the pixel, particularly at a center portion of the pixel is not changed. That is, transmissivity of the backlight in the liquid crystal display device is lowered and hence, brightness is lowered.

In the IPS liquid crystal display device disclosed in patent document 1, the pixel electrodes and the common electrodes are formed on the same TFT substrate and hence, the liquid crystal display device basically has a drawback with respect to transmissivity. Further, the increase of portions which do not contribute to a display in the vicinity of the scanning line is disadvantageous with respect to brightness.

The technique disclosed in patent document 2 is substantially equal to the technique disclosed in patent document 1 except for a point that the directions of the trapezoidal shapes of the pixels are arranged opposite to each other in the lateral direction. Further, the constitution disclosed in patent document 2 is further disadvantageous compared to the constitution disclosed in patent document 1 in terms of transmissivity with respect to a point that the capacitive lines are formed.

The technique disclosed in patent document 3 can increase transmissivity compared to the conventional IPS liquid crystal display device by forming the pixel electrodes and the common electrodes using the transparent electrode. However, in the technique disclosed in patent document 3, the pixel electrode has a rectangular profile, while slits formed in a portion for driving liquid crystal are inclined and hence, a space which does not contribute to a display is increased in upper and lower portions of the pixel. Further, in the technique disclosed in patent document 3, the capacitive lines (common lines) are present for supplying a voltage to the common electrodes and for forming capacitances and hence, transmissivity is lowered.

An IPS liquid crystal display device has began to be used not only as a large-sized display device such as a television receiver set but also as a miniaturized liquid crystal display device driven by a battery such as a mobile phone. In the battery-driven display device, it is difficult to increase electric power of a backlight for increasing brightness and hence, transmissivity of a liquid crystal display device is crucially important. Accordingly, it is an object of the present invention to increase transmissivity of an IPS liquid crystal display device which exhibits excellent viewing angle characteristic.

The present invention has been made to overcome the above-mentioned drawbacks, and is directed to an IPS liquid crystal display device having a TFT substrate on which a common electrode formed of a planar matted electrode and comb-teeth-shaped pixel electrodes are arranged with an insulation film sandwiched between the common electrode and the pixel electrodes, wherein a profile of the pixel electrode is formed in a laterally extending trapezoidal shape, the pixel electrodes are arranged in a packed manner by changing the directions of the trapezoidal shape in the longitudinal direction, and a light blocking film is not provided between the pixel electrodes in the longitudinal direction thus increasing transmissivity.

Further, with respect to a counter substrate of the liquid crystal display device, by forming color filters in a continuous stripe shape along the pixel electrodes, possibility of color mixing is reduced. Further, with respect to the light blocking films arranged in the lateral direction on the counter substrate, the light blocking films are formed only on portions which are inevitable for blocking light to TFTs or the like formed on the TFT substrate, and the light blocking films are not formed on other portions thus increasing transmissivity. To explain specific means of the present invention, they are as follows.

(1) In a liquid crystal display device which includes: a TFT substrate on which electrodes for driving liquid crystal are formed; a counter substrate on which color filters are formed; and liquid crystal which is sandwiched between the TFT substrate and the counter substrate, first planar electrodes, an insulation film which covers the first electrodes, and second electrodes which are formed on the insulation film and have a laterally-extending trapezoidal profile including a comb-teeth shaped electrode are formed on the TFT substrate, the liquid crystal is driven by an electric field generated based on potential difference between the first electrode and the second electrode, the second electrodes are arranged by alternately reversing the direction of the trapezoidal shape in the longitudinal direction, and the second electrodes are arranged by alternately reversing the direction of the trapezoidal shape in the lateral direction, the direction of the comb-teeth-shaped electrode is inclined in a specified direction on an upper portion of the trapezoidal shape and is inclined in the direction opposite to the specified direction on a lower portion of the trapezoidal shape, an alignment axis of the liquid crystal on the TFT substrate is arranged equal to the lateral direction, the color filters are formed on the counter substrate in a stripe shape in the longitudinal direction, and first light blocking films are formed on boundary portions of the color filter on the counter substrate in a stripe shape in the longitudinal direction.

(2) In the liquid crystal display device having the constitution (1), the scanning line extends over a center portion of the second electrode in the lateral direction.

(3) In the liquid crystal display device having the constitution (2), the scanning line extends over the center portion of the second electrode linearly in the lateral direction.

(4) In the liquid crystal display device having the constitution (1), the counter substrate includes second light blocking films which extend in the lateral direction and overlap with thin film transistors formed on the TFT substrate, and at least some second light blocking films are configured to prevent bridging of the neighboring first light blocking films.

(5) In the liquid crystal display device having the constitution (1), the spacers are provided for defining a gap between the TFT substrate and the counter substrate, and the spacers has a longitudinal direction thereof in the lateral direction.

(6) In the liquid crystal display device having the constitution (5), the counter substrate includes second light blocking films which extend in the lateral direction and overlap with thin film transistors formed on the TFT substrate, the some second light blocking films are configured to prevent bridging of the neighboring first light blocking films, and the spacers are formed on some other second light blocking films, and the second light blocking films on which the spacers are formed bridge the neighboring first light blocking films.

(7) In the liquid crystal display device having the constitution (1), on the TFT substrate and the counter substrate, a layer which blocks light is not formed between the two second electrodes arranged adjacent to each other in the longitudinal direction.

(8) In the liquid crystal display device having the constitution (1), the second electrode is a pixel electrode and the first electrode is a common electrode.

(9) In a liquid crystal display device which includes: a TFT substrate on which electrodes for driving liquid crystal are formed; a counter substrate on which color filters are formed; and liquid crystal which is sandwiched between the TFT substrate and the counter substrate, first planar electrodes, an insulation film which covers the first electrodes, and second electrodes which are formed on the insulation film and have a laterally-extending trapezoidal profile including a comb-teeth shaped electrode are formed on the TFT substrate, the liquid crystal is driven by an electric field generated based on potential difference between the first electrode and the second electrode, the second electrodes are arranged by alternately reversing the direction of the trapezoidal shape in the longitudinal direction, and the second electrodes are arranged without alternately reversing the direction of the trapezoidal shape in the lateral direction, the direction of the comb-teeth-shaped electrode is inclined in a specified direction on an upper portion of the trapezoidal shape and is inclined in the direction opposite to the specified direction on a lower portion of the trapezoidal shape, an alignment axis of the liquid crystal on the TFT substrate is arranged equal to the lateral direction, the color filters are formed on the counter substrate in a stripe shape in the longitudinal direction, and first light blocking films are formed on boundary portions of the color filter on the counter substrate in a stripe shape in the longitudinal direction.

(10) In the liquid crystal display device having the constitution (9), the scanning line extends over a center portion of the second electrode in the lateral direction.

(11) In the liquid crystal display device having the constitution (10), the scanning line extends over the center portion of the second electrode linearly in the lateral direction.

(12) In the liquid crystal display device having the constitution (9), the counter substrate includes second light blocking films which extend in the lateral direction and overlap with thin film transistors formed on the TFT substrate, and at least some second light blocking films are configured to prevent bridging of the neighboring first light blocking films.

(13) In the liquid crystal display device having the constitution (9), the spacers are provided for defining a gap between the TFT substrate and the counter substrate, and the spacers has a longitudinal direction thereof in the lateral direction.

(14) In the liquid crystal display device having the constitution (13), the counter substrate includes second light blocking films which extend in the lateral direction and overlap with thin film transistors formed on the TFT substrate, the some second light blocking films are configured to prevent bridging of the neighboring first light blocking films from bridging, and the spacers are formed on some other second light blocking films, and the second light blocking films on which the spacers are formed bridge the neighboring first light blocking films.

(15) In the liquid crystal display device having the constitution (9), on the TFT substrate and the counter substrate, a layer which blocks light is not formed between the two second electrodes arranged adjacent to each other in the longitudinal direction.

(16) In the liquid crystal display device having the constitution (9), the second electrode is a pixel electrode and the first electrode is a common electrode.

According to the present invention, in the IPS liquid crystal display device having the TFT substrate on which the common electrode formed of the planar matted electrode and the comb-teeth-shaped pixel electrodes are arranged with the insulation film sandwiched between the common electrode and the pixel electrodes, the direction of the comb-teeth-shaped pixel electrode is reversed between an upper side and a lower side within the pixel thus reducing the directivity of viewing angle characteristic.

Further, the profile of the pixel electrode is formed in a laterally-extending trapezoidal shape and the pixel electrodes are arranged in a packed manner by changing the direction of the trapezoidal shape in the longitudinal direction, while a light blocking film is not arranged between the pixel electrodes in the longitudinal direction and hence, transmissivity is increased whereby brightness of the liquid crystal display device can be increased.

Further, on the counter substrate, the color filters are formed in a continuous stripe shape along the pixel electrodes thus forming the trapezoidal pixel electrodes and hence, possibility of color mixing can be reduced even when the packed structure is adopted. That is, by forming the color filters in a stripe shape in the longitudinal direction, it is possible to prevent color mixing even when the light blocking film is not formed between the pixel electrodes in the longitudinal direction.

Further, with respect to the light blocking films arranged in the lateral direction on the counter substrate, the light blocking films are formed only on portions which are inevitable for blocking light to TFTs or the like formed on the TFT substrate and the light blocking films are not formed on other portions thus increasing transmissivity.

As described above, according to the present invention, it is possible to realize the liquid crystal display device of high brightness which exhibits excellent viewing angle characteristic.

DESCRIPTION OF THE PREFERRED EMBODIMENT

Figure 1:
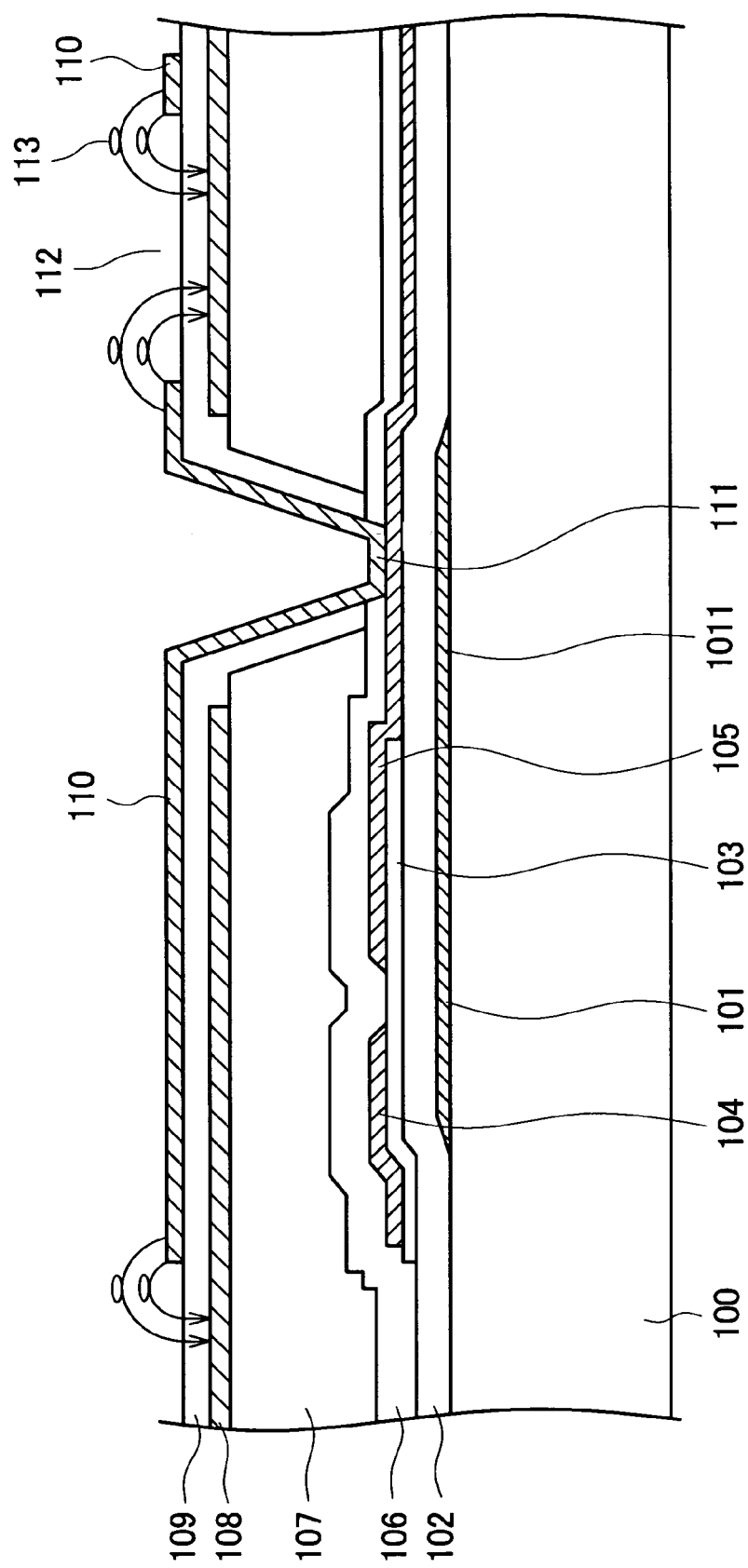
FIG. 1 is a cross-sectional view of a liquid crystal display device to which the present invention is applied.

Prior to the explanation of specific embodiments of the present invention, the structure of an IPS liquid crystal display device (hereinafter, referred to as an IPS) to which the present invention is applied is explained. FIG. 1 is a cross-sectional view of the vicinity of a TFT of the IPS to which the present invention is applied. In FIG. 1, on a TFT substrate 100 made of glass, gate electrodes 101 are formed. The gate electrodes 101 are integrally formed with scanning lines 1011. The gate electrode 101 is formed by stacking an MoCr alloy layer on an AlNd alloy layer.

A gate insulation film 102 made of SiN is formed so as to cover the gate electrodes 101. On the gate insulation film 102, a semiconductor layer 103 made of a-Si is formed at a position where the semiconductor layer 103 faces the gate electrode 101. The semiconductor layers 103 made of a-Si are formed by a plasma CVD method. A channel portion of a TFT is formed in the part of the a-Si layer. A source electrode 104 and a drain electrode 105 are formed on the a-Si layer through the channel portion. The source electrode 104 also functions as a video signal line, and the drain electrode 105 is connected with a pixel electrode 110. Both of the source electrode 104 and the drain electrode 105 are formed on the same layer simultaneously. In this embodiment, the source electrode 104 or the drain electrode 105 is made of MoCr alloy. When it is necessary to lower the electric resistance of the source electrode 104 or the drain electrode 105, for example, the electrode structure which sandwiches an AlNd alloy layer between MoCr alloy layers is used.

An inorganic passivation film 106 is formed of an inorganic insulation film made of SiN or the like so as to cover the TFTs. The inorganic passivation film 106 particularly protects the channel portions of the TFTs from impurities. On the inorganic passivation film 106, an organic passivation film 107 is formed. The organic passivation film 107 also plays a role of leveling a surface of the TFT besides a role of protecting the TFT and hence, the organic passivation film 107 has a large thickness. The thickness of the organic passivation film 107 is set to a value which falls within a range from 1 μm to 4 μm.

The organic passivation film 107 is an organic insulation film, and is made of a photosensitive acrylic resin, silicon resin, polyimide resin or the like. It is necessary to form through holes at positions where the pixel electrodes 110 and the drain electrodes 105 are connected with each other in the organic passivation film 107. Since the organic passivation film 107 is formed of a photosensitive film, it is possible to form the through holes in the organic passivation film 107 by exposing and developing the organic passivation film 107 per se without using a photoresist.

A common electrode 108 is formed on the organic passivation film 107. The common electrode 108 is formed of an ITO (Indium Tin Oxide) film which is a transparent conductive film and is formed on the whole display region by sputtering. That is, the common electrode 108 is formed into a planar shape. After forming the common electrode 108 on the whole surface of the display region by sputtering, only through-hole portions which are necessary for making the pixel electrode 110 and the drain electrode 105 conductive with each other are removed by etching the common electrode 108.

An upper insulation film 109 made of SiN is formed so as to cover the common electrode 108. After forming the upper insulation film 109, through holes are formed in the upper insulation film 109 by etching. Using the upper insulation film 109 as a mask, the through holes 111 are formed by etching the inorganic passivation film 106. Thereafter, a transparent conductive film made of ITO which becomes pixel electrodes 110 later is formed by sputtering so as to cover the upper insulation film 109 and the through holes 111. The pixel electrodes 110 are formed by patterning the ITO film which is formed by sputtering. The ITO film which forms the pixel electrodes 110 is also adhered to the through holes 111. In the through hole 111, the drain electrode 105 which extends from the TFT and the pixel electrode 110 are made conductive with each other so that a video signal is supplied to the pixel electrode 110.

As described later, the pixel electrode 110 is formed of a comb-teeth-shaped electrode with both ends closed. A slit 112 is formed between the comb-teeth-shaped electrodes. A predetermined common voltage is applied to the common electrode 108 and a video signal voltage is applied to the pixel electrodes 110. As shown in FIG. 1, when a voltage is applied to the pixel electrode 110, lines of electric force are generated and liquid crystal molecules 113 are rotated in the direction of the lines of electric force thus controlling the transmission of light from a backlight. That is, by making use of an electric field generated based on potential difference between the pixel electrode 110 and the common electrode 108, the liquid crystal molecules 113 are driven. Since the transmission of light from the backlight can be controlled for every pixel, it is possible to form an image. Here, although an alignment film for aligning the liquid crystal molecules 113 is formed on the pixel electrode 110, the alignment film is omitted from FIG. 1.

In an embodiment explained hereinafter, the explanation is made assuming that the common electrode 108 which is formed into a planar shape is arranged on the organic passivation film 107, and the comb-teeth-shaped pixel electrodes 110 are arranged on the upper insulation film 109. However, opposite to such an arrangement, the present invention is also applicable to a case where the pixel electrodes 110 which are formed into a planar shape are arranged on the organic passivation film 107 and a comb-teeth-shaped common electrode 108 is arranged on the upper insulation film 109 in the same manner as the above-mentioned constitution.

Embodiment 1

Figure 2:
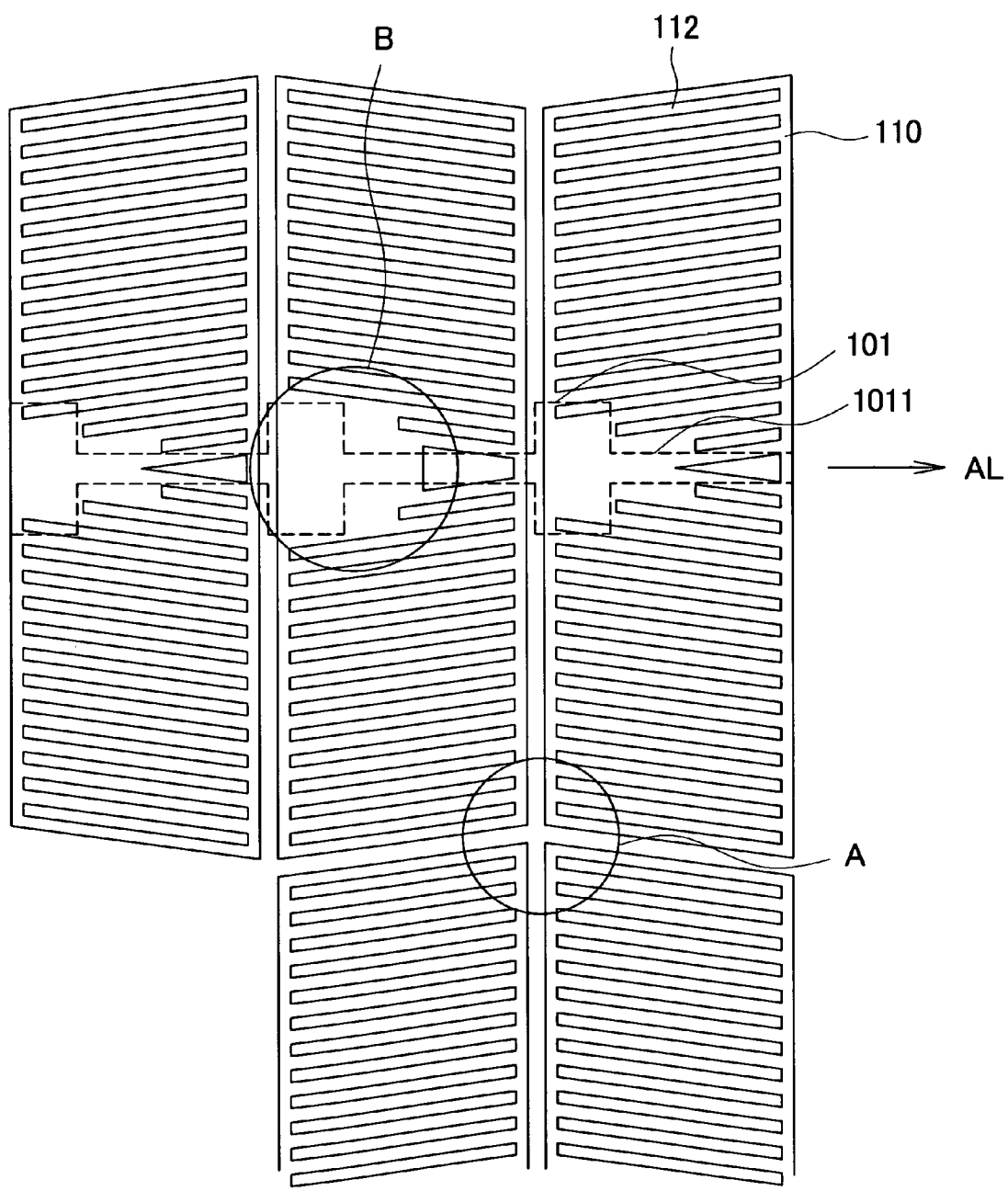
FIG. 2 is a view of the arrangement of pixels of an embodiment 1.
Figure 3:
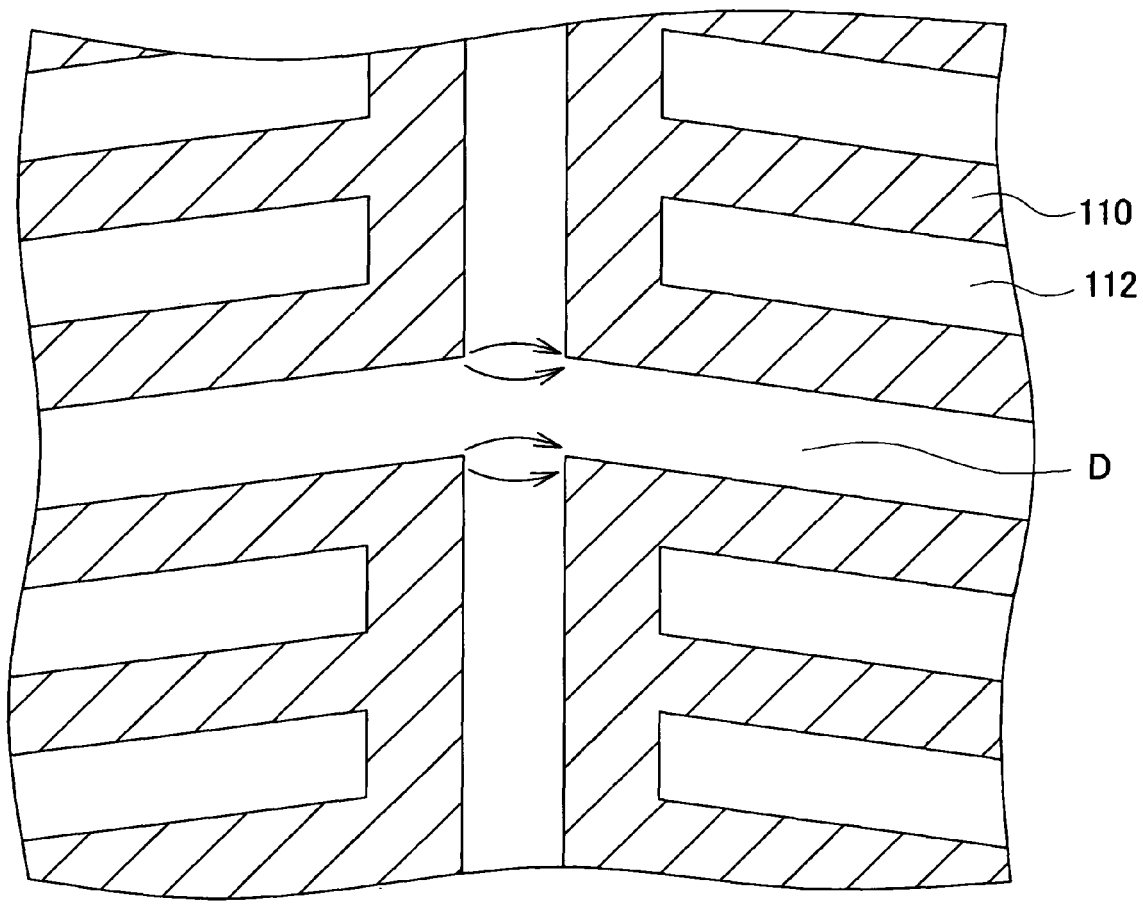
FIG. 3 is a partially enlarged view of the arrangement of the pixels of the embodiment 1.
Figure 4:
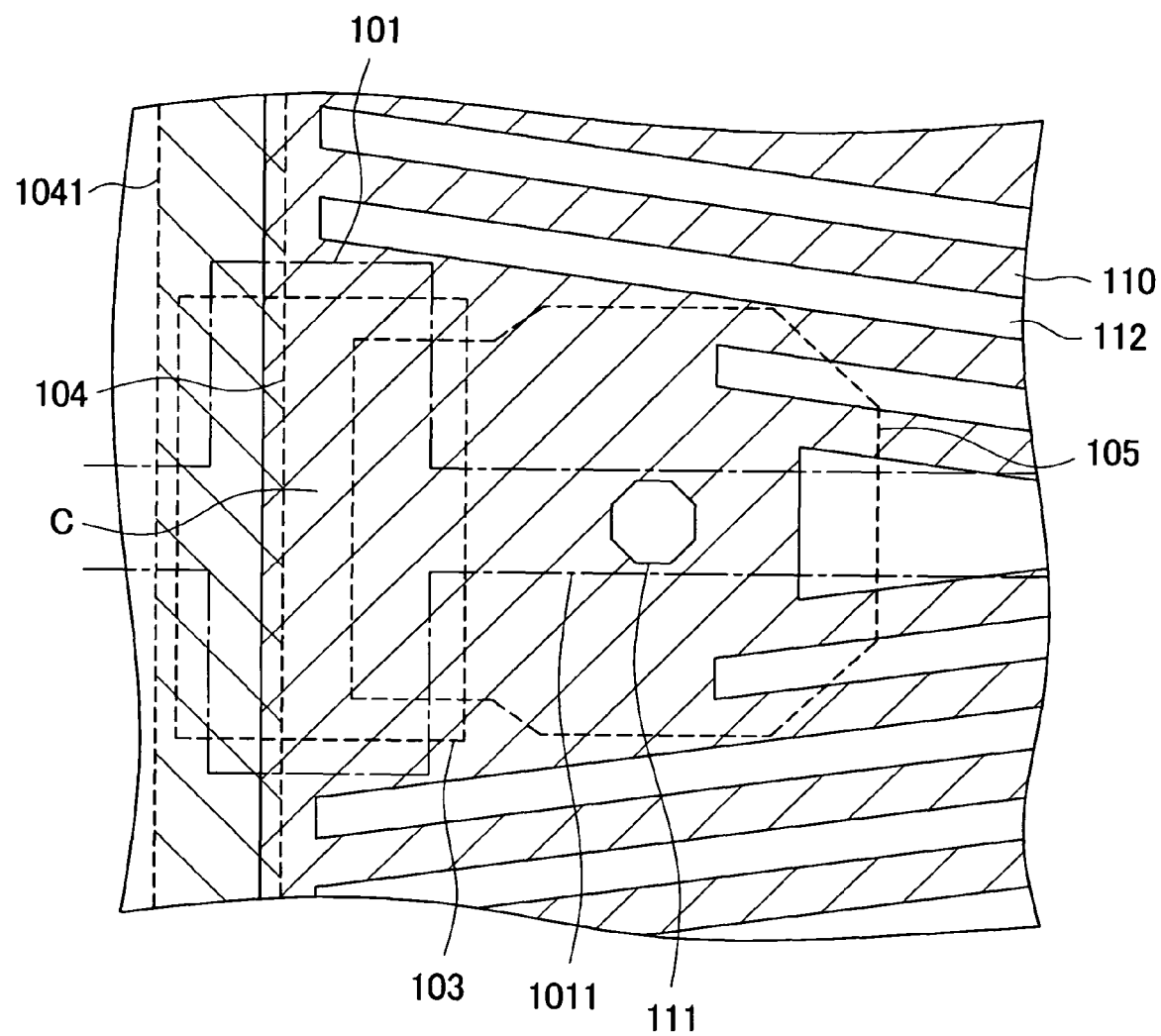
FIG. 4 is a view showing a TFT portion of the embodiment 1 in a see-through manner.

FIG. 2 is a plan view showing the arrangement of the pixels on the TFT substrate 100 of the embodiment 1. FIG. 3 is an enlarged plan view of a portion A which is a boundary portion of the pixel shown in FIG. 2. FIG. 4 is an enlarged view of a portion B which is the vicinity of the TFT in FIG. 2 in a see-through manner.

In FIG. 2, to prevent the drawing from becoming complicated, only the pixel electrodes 110 and the scanning line 1011 are shown. In FIG. 2, the pixel is formed in a laterally extending trapezoidal shape. Conventionally, the pixel is defined by a region surrounded by video signal lines and scanning lines. However, in this embodiment, the pixel is defined by the pixel electrode 110 per se. The pixels are arranged by alternately changing (reversing) the direction of the laterally extending trapezoidal shape in the longitudinal direction to have the packed structure.

Further, in this embodiment, the pixels are arranged by alternately changing (reversing) the direction of the laterally extending trapezoidal shape in the lateral direction.

Further, upper and lower boundaries of the pixel in the longitudinal direction are defined neither by the scanning lines nor by the capacitive lines. That is, the light blocking films are not present on the upper and lower boundaries of the pixel. That is, light blocking capacitive lines which traverse the display region are not formed on the TFT substrate 100 side. Also on the counter substrate 200 side, the light-blocking films are not formed on upper and lower boundaries of the pixel. Accordingly, upper and lower ends of the pixel can be also used for forming the image and hence, the transmissivity can be increased whereby a liquid crystal display device having high brightness can be realized. FIG. 3 is the enlarged view of the portion A shown in FIG. 2 which is boundary portion between the pixels.

In FIG. 3, corner portions of four pixels are shown. In general, different voltages are applied to these four pixels respectively. The video signal line which extends in the longitudinal direction is formed between two left pixels and two right pixels and hence, a portion where the video signal line is formed does not contribute to the formation of the image. Further, an alignment axis of liquid crystal extends in the lateral direction in the drawing and hence, even when an electric field is applied to the liquid crystal in the lateral direction, the liquid crystal does not move whereby color mixing does not occur.

On the other hand, in a gap D defined between two pixels which are arranged adjacent to each other in the longitudinal direction, the transmissivity of liquid crystal is changed by being influenced by the potential difference between the pixel electrode 110 and the common electrode 108. An upper side of the gap D portion is controlled by the upper pixel electrode 110, and a lower side of the gap D portion is controlled by the lower pixel electrode 110. Further, besides the above-mentioned phenomenon, liquid crystal is driven also by a potential difference generated between the upper pixel electrode 110 and the lower pixel electrode 110. However, with respect to two pixels which are arranged adjacent to each other in the longitudinal direction, a drawback on color mixing does not occur by forming color filters in a stripe shape in the longitudinal direction.

Accordingly, the present invention aims at the increase of transmissivity by obviating the formation of the light blocking film on the gap D portion. For this end, it is necessary to eliminate the influence of other electrode on this portion.

What must be considered here is the influence exerted by an electric field in the oblique direction as viewed in a plan view which is generated due to the relationship between the right upper pixel and the left lower pixel, that is, by two pixel electrodes 110 arranged adjacent to each other in the oblique direction. When the electric field in the oblique direction extends to the gap D portion, liquid crystal is driven due to the difference between the direction of alignment axis of liquid crystal and the direction of the electric field.

However, in FIG. 3, four pixels face each other respectively only at corner portions thereof thus providing the arrangement which makes each pixel difficult to be influenced by other pixels. For example, FIG. 3 shows a case in which left-side pixels have a potential higher than a potential of the right-side pixels. It is understood from FIG. 3 that lines of electric force in this case concentrate on the corner portions and other portions are not influenced by lines of electric force.

Further, to consider also the relationship between the right upper pixel and the left lower pixel, that is, the relationship between two pixels which are arranged adjacent to each other in the oblique direction, the pixel electrode 110 of the right upper pixel and the pixel electrode 110 of the left lower pixel face each other only at corner portions thereof under the point-to-point relationship. Accordingly, even when an electric field is generated in the oblique direction between both pixel electrodes 110 in a plan view, most of electric field is concentrated on only the corner portions and the electric field hardly infiltrate into a deep portion away from the corner portion, that is, the gap D portion. Accordingly, the above-mentioned pixel arrangement provides the structure which can prevent color mixing between both pixels. The same goes for the relationship between the left upper pixel and the right lower pixel.

That is, by adopting the pixel arrangement shown in FIG. 2, even when the light blocking film is not formed between the pixels in the longitudinal direction, that is, on the portion D shown in FIG. 3, it is possible to prevent the contamination between the pixels such as color mixing. Accordingly, due to the constitution of this embodiment, transmissivity can be increased thus realizing the increase of brightness.

As shown in FIG. 2, a profile of each pixel is formed in a laterally extending trapezoidal shape. In FIG. 2, slits 112 are formed along sides of the trapezoidal shape. In other words, the comb-teeth-shaped pixel electrodes 110 are formed with the same inclination as the sides of the trapezoidal shape. Accordingly, the inclination of the pixel electrode 110 becomes opposite to each other between an upper side and a lower side. Due to such constitution, as explained hereinafter, it is possible to eliminate the directivity of viewing angle.

When a video signal voltage is applied to the pixel electrode 110, as explained in conjunction with FIG. 1, lines of electric force is generated from the pixel electrode 110 to the planar common electrode 108 arranged below the pixel electrode 110 through the slit 112 and via the upper insulation film 109, and liquid crystal is rotated along the lines of electric force and hence, light from a backlight which passes through the pixel is controlled thus forming an image.

In this embodiment, the direction of alignment axis of liquid crystal is the lateral direction as indicated by an arrow AL in FIG. 2. When a video signal voltage is applied to the pixel electrode 110, since the direction of the comb-teeth-shaped pixel electrode 110 is opposite to each other between an upper half portion and a lower half portion of the pixel, the rotational direction of liquid crystal differs from each other between an upper side and a lower side of the pixel electrode 110. Accordingly compared to a case in which the liquid crystal molecules 113 are rotated only in a specified direction, it is possible to reduce the directivity of viewing angle. That is, it is possible to provide the multi-domain pixel structure.

On the other hand, between the upper portion and the lower portion of the pixel, the inclination of the comb-teeth-shaped pixel electrode 110 is opposite to each other and hence, a triangular region which does not contribute to the formation of an image is formed at the center of the pixel in the longitudinal direction. In this embodiment, by extending the scanning line 1011 over this portion, the reduction of transmissivity is prevented as the whole pixel. In this embodiment, the scanning line 1011 extends linearly in the lateral direction.

FIG. 4 is an enlarged see-through view of a portion B in FIG. 2. In FIG. 4, the gate electrode 101 and the scanning line 1011 are indicated by a chained line. A portion of the scanning line 1011 where a width of the scanning line 1011 is enlarged forms the gate electrode. The semiconductor layer 103 indicated by a dotted line is formed on the gate electrode 101 by way of the gate insulation film 102 not shown in the drawing. A shape of the semiconductor layer 103 in FIG. 4 is a rectangular shape. The source electrode 104 is arranged on a left side of the semiconductor layer 103. In this case, the video signal line 1041 indicated by hatching also functions as the source electrode 104.

The drain electrode 105 indicated by a dotted line is arranged on a right side of the semiconductor layer 103. The drain electrode 105 faces the source electrode 104. Although a portion of the drain electrode 105 which overlaps with the semiconductor layer 103 has a rectangular shape, a further right extending portion of the drain electrode 105 has a pseudo octagonal shape. Such constitution is provided for making the drain electrode 105 larger than the through hole formed in the organic passivation film 107. Here, in FIG. 4, for preventing the drawing from becoming complicated, a shape of the through hole formed in the organic passivation film 107 and the upper insulation film 109 is not described in the drawing.

In FIG. 4, a gap C of a portion where the source electrode 104 and the drain electrode 105 face each other forms a channel portion of the TFT. At an approximately center portion of the drain electrode 105 which is formed in a pseudo octagonal shape, a through hole 111 which is formed in the inorganic passivation film 106 having a pseudo octagonal planar shape is provided. The through hole 111 is formed in the inside of the through hole formed in the upper insulation film 109 and the organic passivation film 107.

On the source electrode 104 or the drain electrode 105, the pixel electrode 110 is formed by way of the inorganic passivation film 106, the organic passivation film 107, the common electrode 108 and the upper insulation film 109. Here, the common electrode 108 is formed in a planar shape except for a portion thereof around the through hole and hence, the common electrode 108 is not shown in FIG. 4.

In FIG. 4, the pixel electrode 110 is depicted by hatching. As shown in FIG. 4, the slit 112 is formed between the pixel electrodes 110. When a voltage is applied to the pixel electrode 110, lines of electric force extend toward the lower common electrode 108 from the pixel electrode 110 through the slit 112, and some lines of electric force rotate the liquid crystal molecules 113 on boundaries of the slit 112 and the pixel electrode 110 thus controlling light from the backlight so as to form an image.

Figure 5:
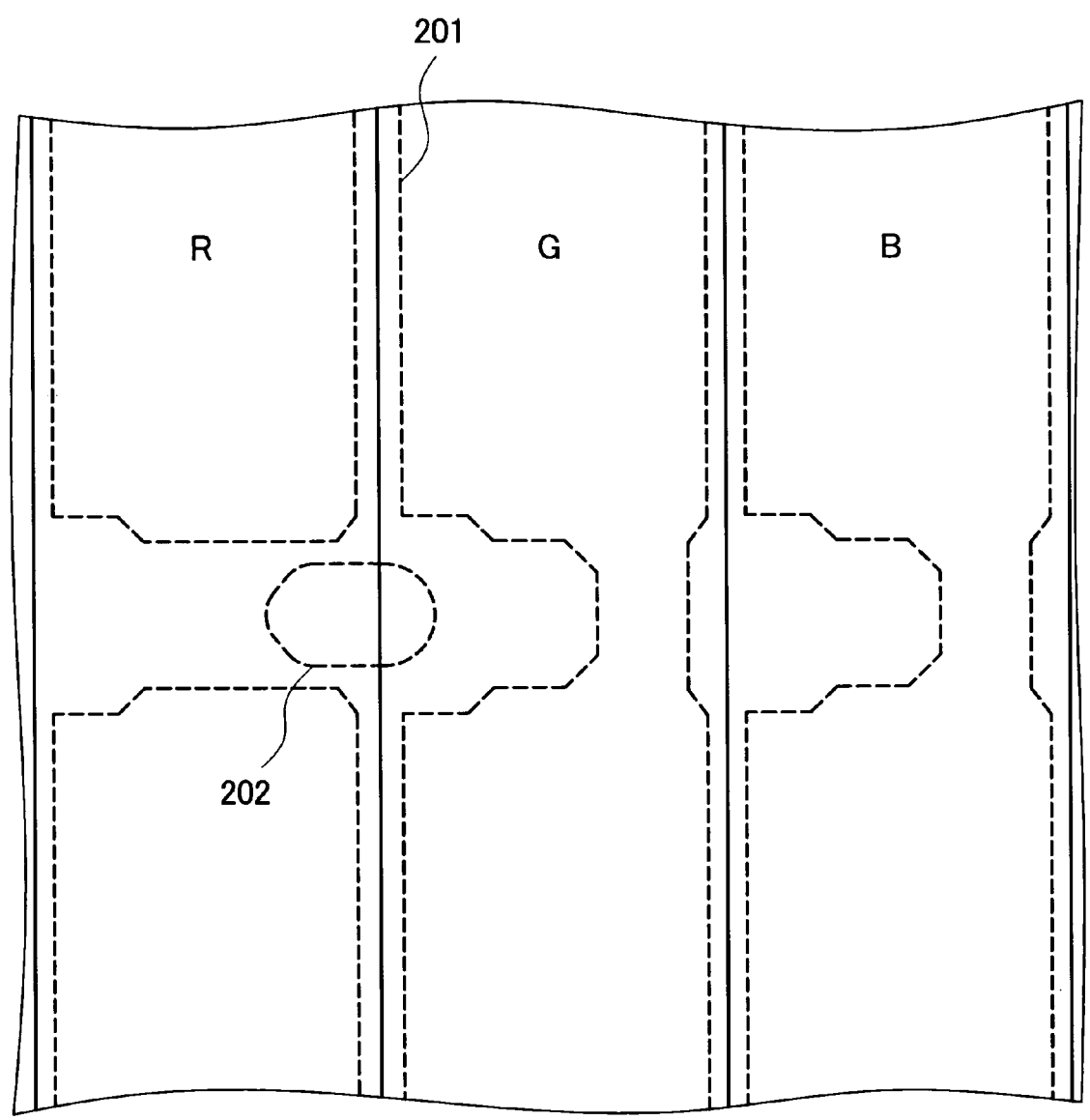
FIG. 5 is a plan view of a counter substrate as viewed from a TFT substrate side.

FIG. 5 is a view of the counter substrate 200 corresponding to the TFT substrate 100 shown in FIG. 2 as viewed from a TFT substrate 100 side. Although the color filters a mounting approximately one pixel in the longitudinal direction are shown in FIG. 5, in an actual model, the red filter R, the green filter G and the blue filter B are formed in a stripe shape. In the pixel arrangement shown in FIG. 2, the pixels which display the same color are arranged in the longitudinal direction. Accordingly, it is unnecessary to consider color mixing in the longitudinal direction.

In FIG. 5, the light blocking films 201 which are formed on the counter substrate 200 are indicated by a dotted line. The light blocking films 201 are formed on a glass substrate side compared to the color filter and hence, the light blocking films 201 are indicated by dotted lines. The light blocking films 201 are formed of a black resin and contribute to the enhancement of contrast of an image. The light blocking films 201 may be made of metal such as Cr.

The light blocking films 201 are formed in a stripe shape in the longitudinal direction along boundaries of the color filters. In the present invention, the light blocking films 201 are formed in the lateral direction on only portions of the TFT substrate where the TFTs 100 and the drain electrodes 105 are formed. That is, in this embodiment, at least some light blocking films 201 in the lateral direction are not configured to form bridging between the neighboring light blocking films 201 in the longitudinal direction. On the other hand, the light blocking films 201 having the conventional structure are continuously formed along the boundaries of the pixels in the lateral direction. That is, the light blocking films 201 arranged adjacent to each other are bridged to each other. Due to such constitution, in the present invention, an area in which the light blocking films 201 of the counter substrate 200 are formed is relatively small compared to the conventional liquid crystal display device. Accordingly, in the present invention, it is possible to increase the brightness by reducing blocking of light from the backlight. Here, the light blocking films 201 in the lateral direction may be formed so as to cover only the TFTs without covering the drain electrodes 105.

In FIG. 5, with respect to the green filter G and the blue filter B, the light blocking films 201 in the lateral direction are not configured to bridge the neighboring light blocking films 201 in the longitudinal direction and are cut from each other. In such a portion, the scanning line 1011 extends on the TFT substrate 100 and hence, blocking of light from the backlight is performed by the scanning line 1011. Due to such constitution, the transmissivity can be increased.

On the other hand, with respect to the red filter R, the light blocking film 201 are bridged to each other. That is, the light blocking films 201 which are arranged adjacent in the longitudinal direction are bridged to each other. This is because the columnar spacer 202 is formed on the light blocking film 201 in the red filter R. The columnar spacer 202 is provided for holding the distance between the TFT substrate 100 and the counter substrate 200 to a predetermined value. The columnar spacer 202 shown in FIG. 5 has a laterally elongated oblong circle.

To hold the distance between the TFT substrate 100 and the counter substrate 200 to a fixed value, it is necessary to ensure a cross-sectional area of the columnar spacer 202 to some extent. By elongating the columnar spacer 202 in the lateral direction, it is possible to ensure the cross-sectional area of the columnar spacer 202 without increasing a width of the light blocking film 201 in the longitudinal direction, that is, without reducing the transmissivity. Here, the shape of the columnar spacer 202 is not limited to an oblong circle and the columnar spacer 202 may be formed into any shape such as an elliptical shape, a rectangular shape provided that the columnar spacer 202 is formed into a laterally elongated shape or a shape which has the longitudinal direction in the lateral direction.

Here, in a boundary portion of two neighboring pixels in the longitudinal direction (portion corresponding to the gap D in FIG. 3), that is, in a portion of the boundary corresponding to the oblique side of the trapezoidal shape, the light blocking film 201 is not formed. Due to such constitution, a numerical aperture of the pixel can be enhanced. The color filters are arranged in a stripe shape such that the same color extends longitudinally and hence, there arises no possibility of the occurrence of color mixing.

Embodiment 2

In the present invention, to increase the transmissivity as much as possible, an area where the scanning line 1011 (gate electrode 101) and the drain electrode 105 overlap with each other is increased. In this case, a capacitance Cgd between the gate electrode 101 and the drain electrode 105 is increased. When the capacitance Cgd is increased, a so-called voltage shift which is a phenomenon in which a voltage of the pixel electrode 110 is changed due to a change of the gate voltage is increased. Accordingly, it is preferable to set the capacitance Cgd to a small value. This embodiment is provided for setting the capacitance Cgd to a small value.

Figure 6:
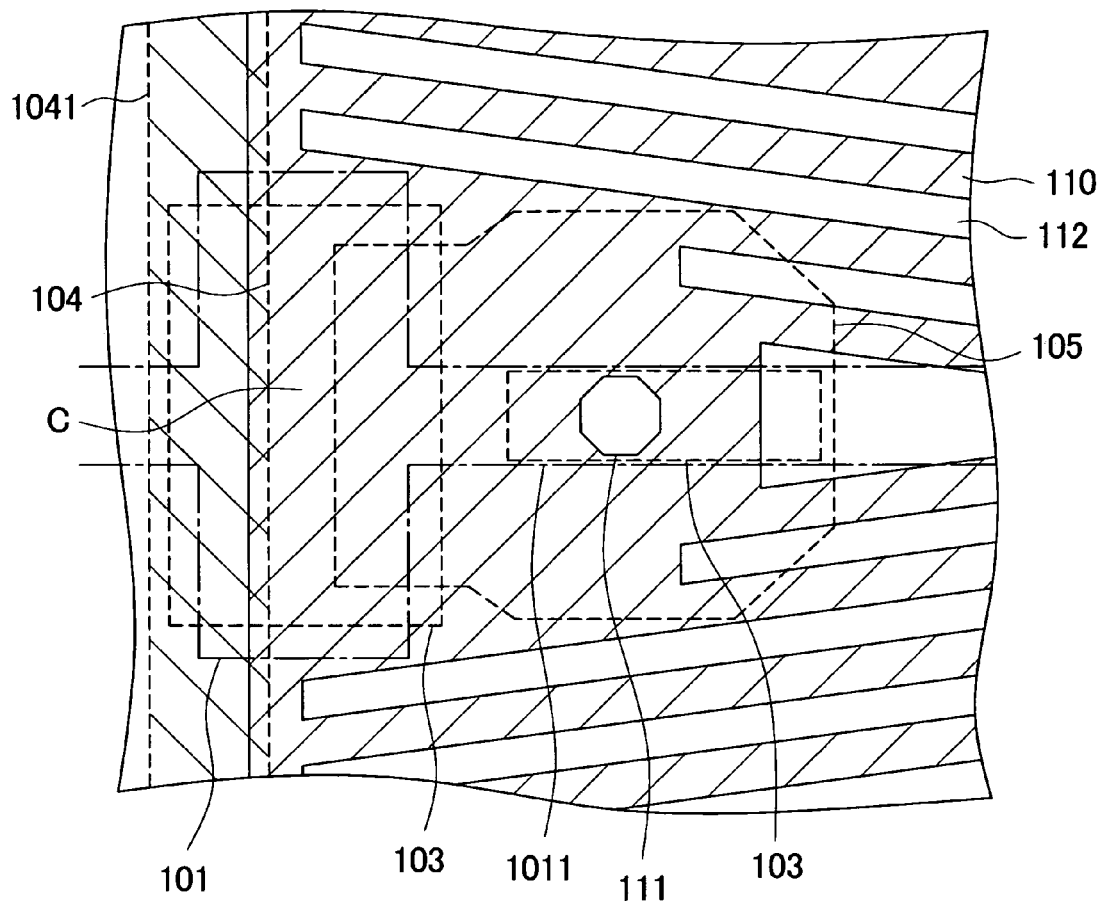
FIG. 6 is a view showing a TFT portion of an embodiment 2 in a see-through manner.

The pixel position in this embodiment is substantially equal to the pixel position shown in FIG. 2. However, this embodiment 2 differs from the embodiment 1 with respect to the structure of the portion B shown in FIG. 2. FIG. 6 is a plan view showing an example of the constitution which decreases a capacitance Cgd between a scanning line 1011 (gate electrode 101) and a drain electrode 105 in this embodiment. In FIG. 6, a semiconductor layer 103 having a rectangular shape is formed in the vicinity of a through hole 111 such that the semiconductor layer 103 overlaps with the scanning line 1011 indicated by a chained line by way of the gate insulation film 102 not shown in the drawing. The drain electrode 105 is formed on the semiconductor layer 103. Since the semiconductor layer 103 is provided in this manner, the gate insulation film 102 and the semiconductor layer 103 are present between the scanning line 1011 and the drain electrode 105. Accordingly, the distance between the scanning line 1011 and the drain electrode 105 is increased by an amount of the presence of the gate insulation film 102 and the semiconductor layer 103 and hence, it is possible to reduce the capacitance Cgd between the scanning line 1011 and the drain electrode 105. Other constitutions shown in FIG. 6 are substantially equal to the corresponding constitutions shown in FIG. 4 and hence, the explanation of the constitutions shown in FIG. 6 is omitted.

In FIG. 6, a width of the semiconductor layer 103 which extends along the scanning line 1011 is set slightly smaller than a width of the scanning line 1011. This width setting is adopted for preventing breaking of step at an end portion. The width of the semiconductor layer 103 may be equal to or larger than the width of the scanning line 1011.

Figure 7:
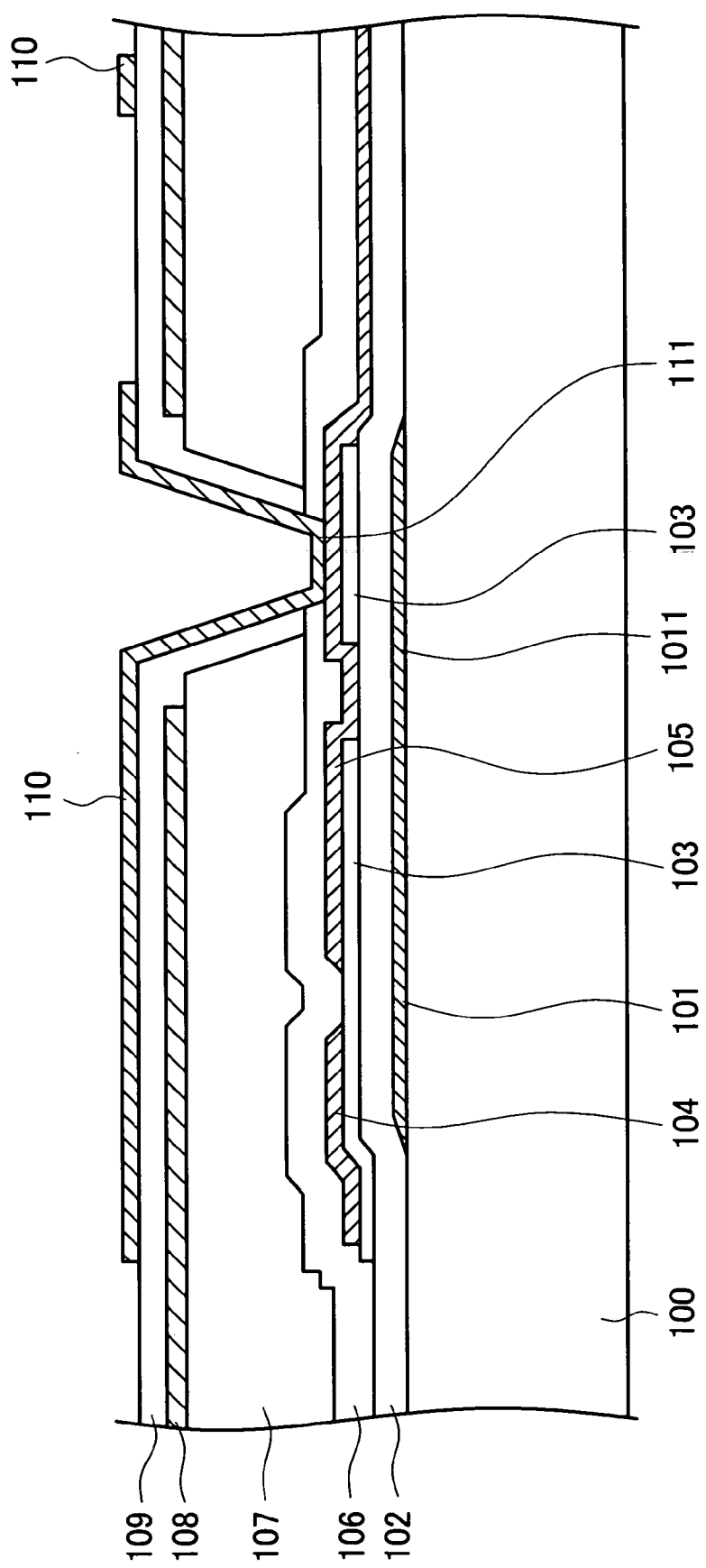
FIG. 7 is a cross-sectional view of the TFT portion of the embodiment 2.

FIG. 7 is a schematic cross-sectional view corresponding to FIG. 6. In FIG. 7, except for the constitution of the through hole 111 and the vicinity of the through hole 111, the constitution shown in FIG. 7 is substantially equal to the corresponding constitution shown in FIG. 1. In FIG. 7, the semiconductor layer 103 is formed below the through hole 111 and the drain electrode 105 in the vicinity of the through hole 111. The semiconductor layer 103 is close to an insulation material in characteristic in a usual state. Accordingly, the distance between the drain electrode 105 and the scanning line 1011 can be increased by an amount corresponding to a film thickness of the semiconductor layer 103 and hence, the capacitance Cgd between the scanning line 1011 (gate electrode 101) and the drain electrode 105 can be decreased. Accordingly, for example, the capacitance Cgd can be decreased by approximately 25%.

Figure 8:
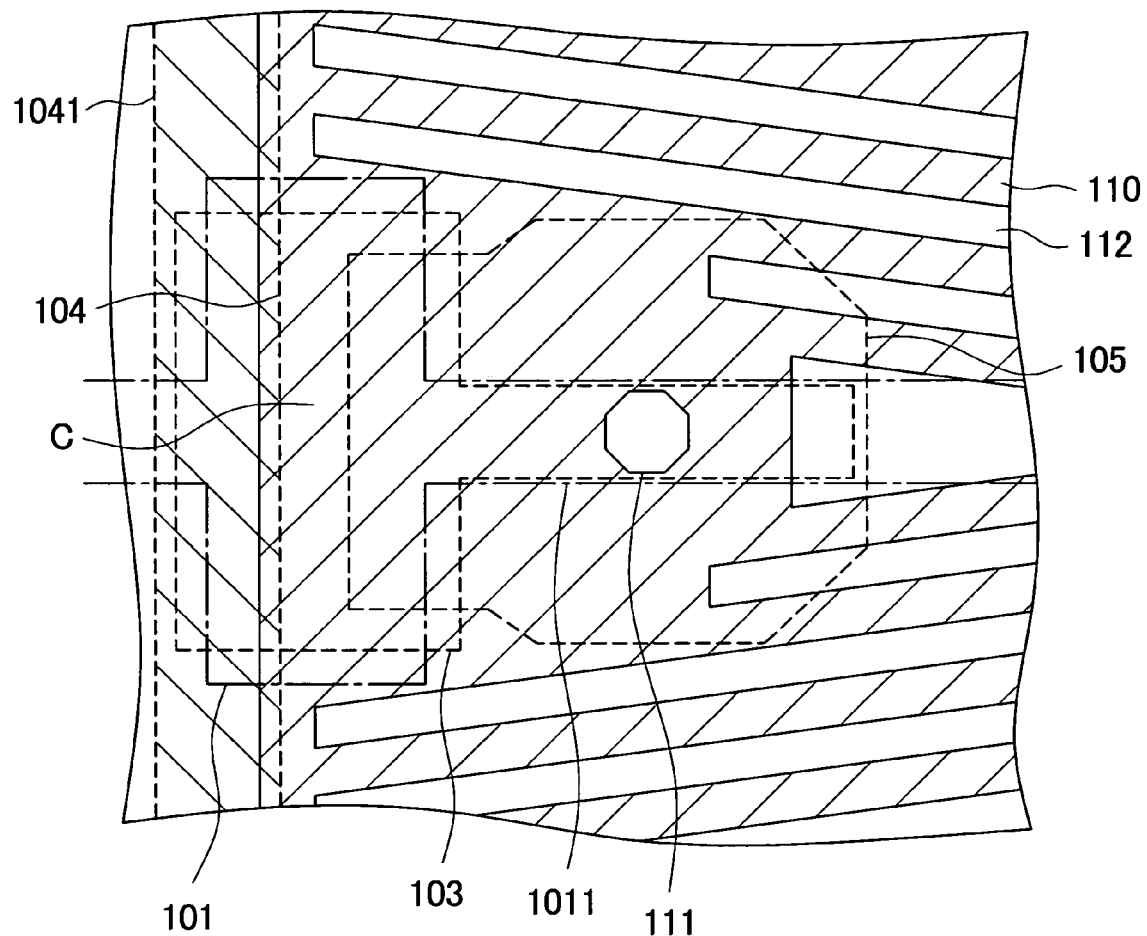
FIG. 8 is a view showing a TFT portion according to another modification of the embodiment 2 in a see-through manner.

FIG. 8 shows a second modification of this embodiment. FIG. 8 is a detailed plan view of a portion B shown in FIG. 2. In FIG. 8, the semiconductor layer 103 extends along a scanning line 1011 from a portion where a TFT is formed. In FIG. 8, the semiconductor layer 103 is continuously (integrally) formed with a semiconductor layer of a TFT portion by way of a gate insulation film 102 not shown in the drawing in the vicinity of the through hole 111 in a state that the semiconductor layer 103 overlaps with the scanning line 1011 indicated by a chained line. The drain electrode 105 is formed over the semiconductor layer 103. Accordingly, due to the presence of the semiconductor layer 103, the gate insulation film 102 and the semiconductor layer 103 are present between the scanning line 1011 and the drain electrode 105 and hence, the distance between the scanning line 1011 and the drain electrode 105 can be increased correspondingly whereby the capacitance Cgd between the scanning line 1011 and the drain electrode 105 can be decreased.

This modification is characterized by the continuous (integral) formation of the semiconductor layer 103 with the semiconductor layer 103 of the TFT portion. Due to such a technical feature, the capacitance Cgd can be further decreased compared to the first modification of this embodiment. Other constitutions of this modification are substantially equal to the corresponding constitutions of the first modification.

In FIG. 8, a width of the semiconductor layer 103 which extends along the scanning line 1011 is set slightly smaller than a width of the scanning line 1011. This width setting is adopted for preventing breaking of step at an end portion. The width of the semiconductor layer 103 may be set equal to or larger than the width of the scanning line 1011.

Figure 9:
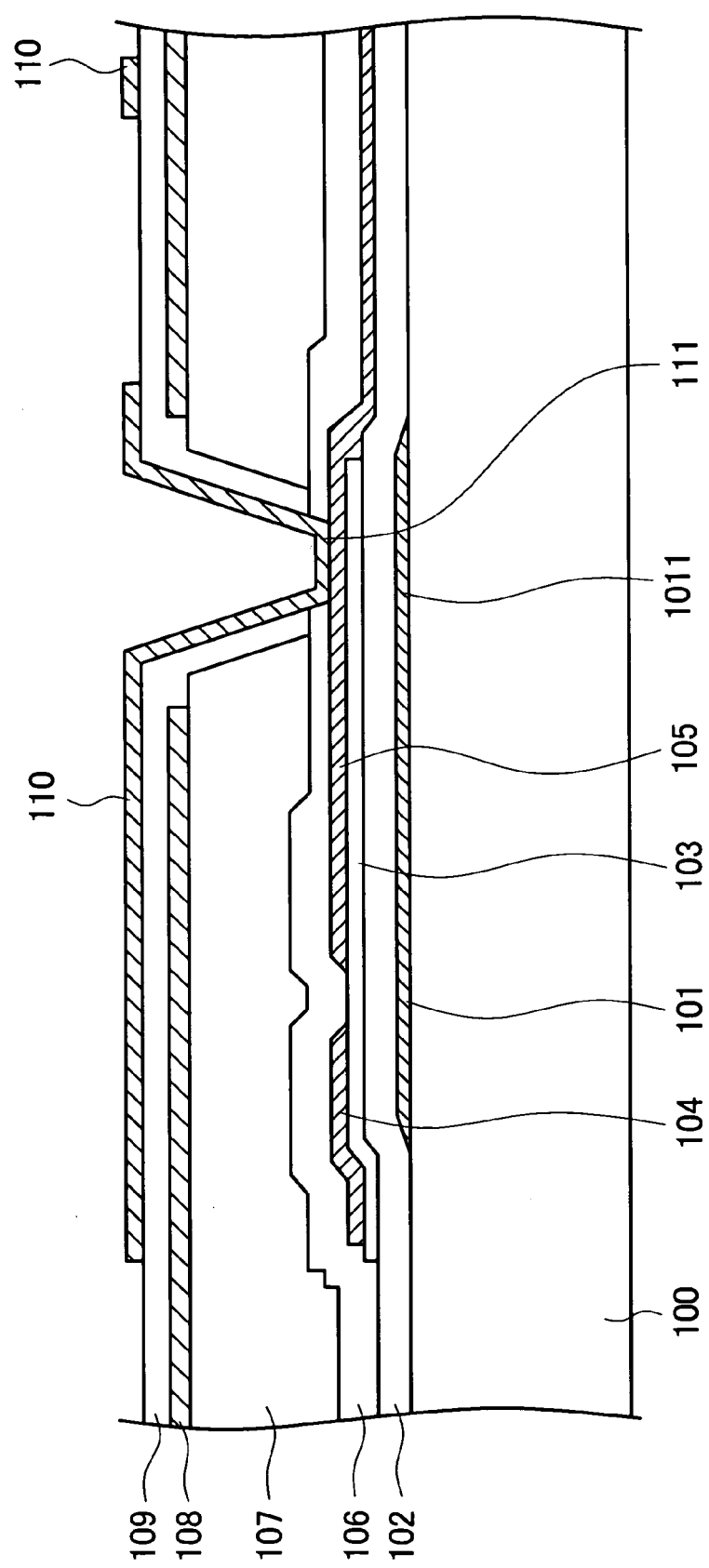
FIG. 9 is a cross-sectional view of the TFT portion according to another modification of the embodiment 2.

FIG. 9 is a schematic cross-sectional view corresponding to FIG. 8. In FIG. 9, the semiconductor layer 103 is formed below the through hole 111 and the drain electrode 105 arranged in the vicinity of the through hole 111. This modification differs from the first modification of this embodiment with respect to a point that the semiconductor layer 103 is continuously (integrally) formed with the semiconductor layer 103 of the TFT portion. Also in this modification, the distance between the drain electrode 105 and the scanning line 1011 is increased by an amount corresponding to a film thickness of the semiconductor layer 103 and hence, the capacitance Cgd between the scanning line 1011 (gate electrode 101) and the drain electrode 105 can be decreased. Further, in this modification, the semiconductor layer 103 of the TFT portion and the semiconductor layer 103 which extends over the scanning line 1011 can be continuously (integrally) formed and hence, the capacitance Cgd between the scanning line 1011 (gate electrode 101) and the drain electrode 105 can be further decreased accordingly.

Except for the constitution of the vicinity of the TFT explained above, the pixel constitution of the TFT substrate 100 and the constitution of the counter substrate 200 of this embodiment are substantially equal to the corresponding constitutions of the embodiment 1 and hence, the explanation of these constitutions is omitted.

Embodiment 3

Figure 10:
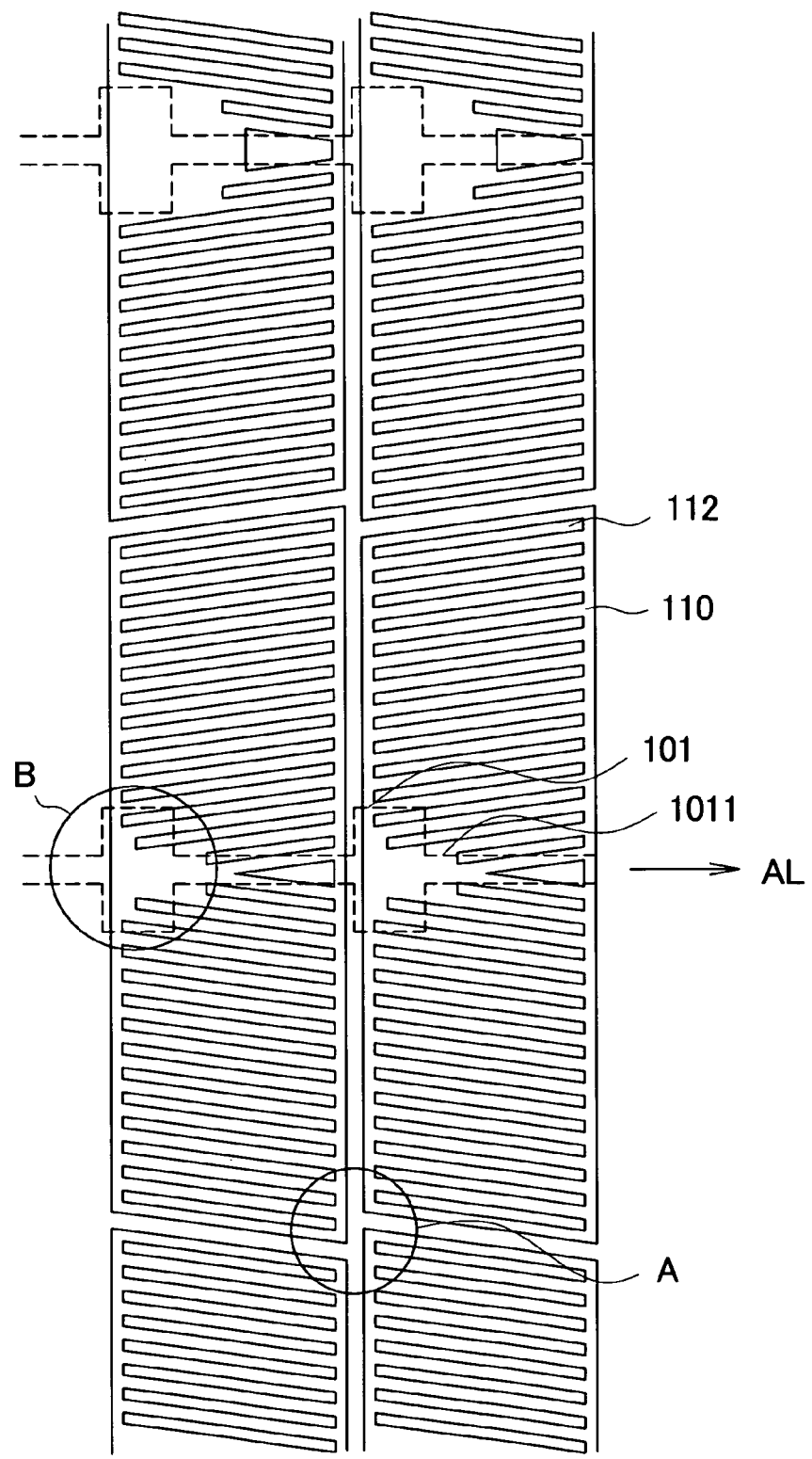
FIG. 10 is an arrangement view of a pixel of an embodiment 3.
Figure 11:
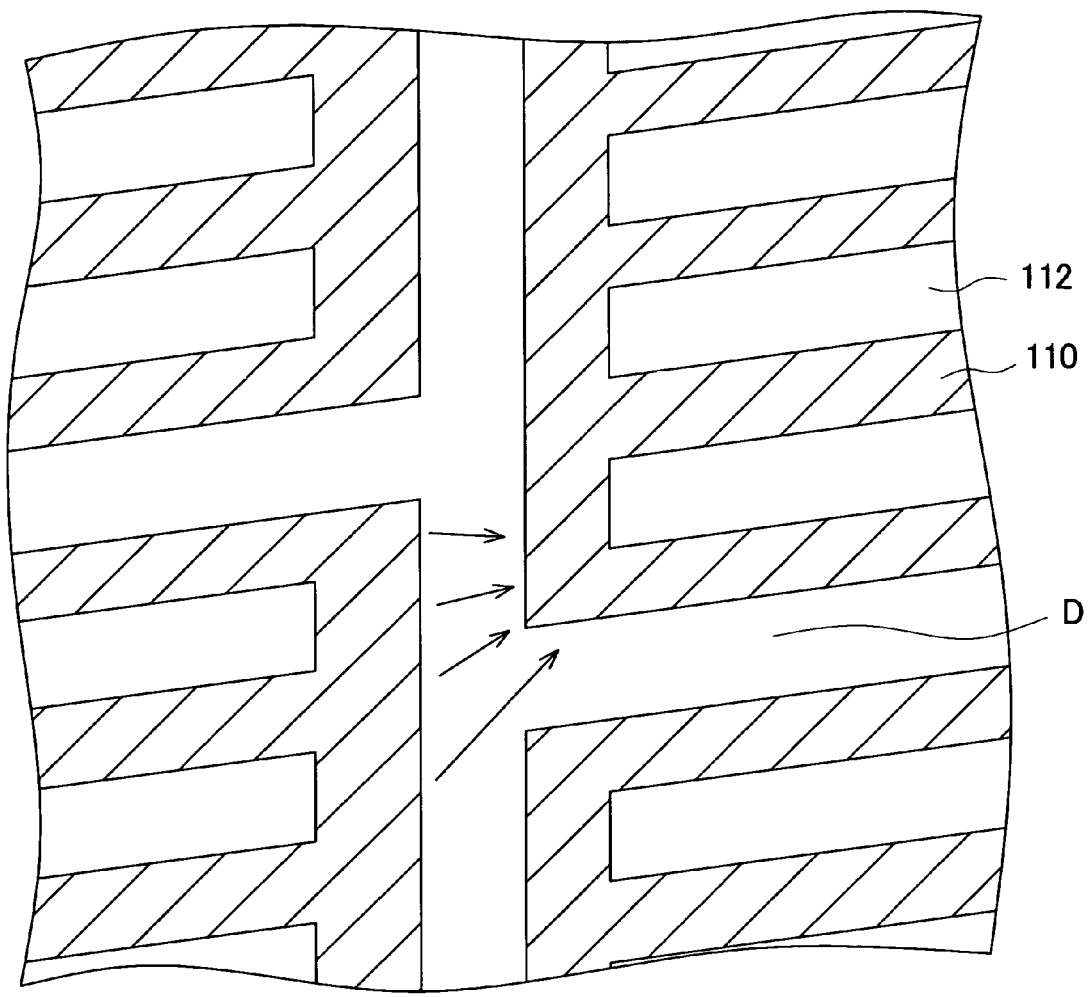
FIG. 11 is a partially enlarged view of the arrangement of the pixel of the embodiment 3.

FIG. 10 is a plan view showing the arrangement of pixels on a TFT substrate 100 of the embodiment 3 of the present invention. FIG. 11 is an enlarged plan view of a portion A which is a boundary portion of the pixel shown in FIG. 10. In FIG. 10, to prevent the drawing from becoming complicated, only pixel electrodes 110 and scaling lines 1011 are described. In FIG. 10, the pixel is formed in a laterally extending trapezoidal shape. Also in this embodiment, in the same manner as the embodiment 1, the pixel is defined by the pixel electrode 110 per se. The pixels are arranged by alternately changing (reversing) the direction of the laterally extending trapezoidal shape in the longitudinal direction thus forming the packed structure.

On the other hand, the arrangement of pixels in the lateral direction of this embodiment differs from the corresponding pixel arrangement of the embodiment 1. In this embodiment 3, the pixels having a laterally extending trapezoidal shape are arranged in the same direction with respect to the lateral direction, that is, without alternately changing the direction with respect to the lateral direction. This difference, except for that the difference arises between the embodiment 3 and the embodiment 1 at a corner portion where four pixels face each other, produces no fundamental difference compared to the embodiment 1. A portion B in FIG. 10 is substantially equal to the portion B in FIG. 4 except for that a shape of the pixel electrode slightly differs between the embodiment 1 and the embodiment 3.

In the embodiment 3, in the same manner as the structure of the pixel electrode 110 of the embodiment 1, the comb-teeth-shaped pixel electrode 110 in the trapezoidal pixel extends in the right upper direction in an upper half portion of the pixel, and extends in the right lower direction in a lower half portion of the pixel. An alignment axis of liquid crystal is the lateral direction in the same manner as the embodiment 1. Accordingly, in the same manner as the embodiment 1, when a video signal is applied to the pixel electrode 110, the direction that liquid crystal molecules 113 are rotated becomes opposite to each other between the upper half portion and the lower half portion of the pixel thus reducing directivity of viewing angle.

In the same manner as the embodiment 1, a counter substrate 200 is arranged so as to face the TFT substrate 100 on which the pixel electrodes 110 are formed, and color filters formed on the counter substrate 200 are formed in a stripe shape corresponding to the pixels formed on the TFT substrate 100 in the longitudinal direction. Due to such constitution, also in this embodiment, it is unnecessary to consider a drawback on color mixing in the longitudinal direction. Further, also in this embodiment, in the same manner as the embodiment 1, as shown in FIG. 5, right blocking films 201 formed on the counter substrate 200 are formed in a longitudinally stripe shape along a boundary of the color filters and, at the same time, the light blocking film 201 is formed in a space-apart manner corresponding to a portion where the TFT or the drain electrode 105 of the TFT substrate 100 in the vicinity of the center of the pixel electrode 110. Further, in the same manner as the embodiment 1, the light blocking film 201 extending in the lateral direction may be formed at a place where the spacer 202 is formed in a state that the light blocking film 201 traverses the color filter. Further, in the same manner as the embodiment 1, the light blocking film 201 is not formed on a boundary between two pixels arranged adjacent to each other in the longitudinal direction (a portion corresponding to a gap D in FIG. 11), that is, a portion corresponding to portions of oblique sides of the trapezoidal pixel. Further, also in the same manner as the embodiment 1, a film which blocks light is not formed also on the TFT substrate 100 at the gap D portion. Also in the same manner as the embodiment 1, capacitive lines are unnecessary within a display region.

FIG. 11 is an enlarged view of a portion A shown in FIG. 10 which is a boundary portion between the pixels. In FIG. 11, corner portions of four pixels are illustrated. Different from the embodiment 1, in this embodiment, the corner portions of four pixels 110 do not face each other, but the corner portions of two pixels on a right side face a side portion of the pixel on a left side.

In general, voltages which are all different from each other are applied to four pixels. Accordingly, when the corner portions of four pixels face each other, an electric field is concentrated on the corner portions thus giving rise to possibility that abnormal electric field distribution is generated. In this embodiment, the corner portions which face each other are limited to only two places and hence, the possibility of generation of the abnormal electric field distribution can be reduced. On the other hand, for example, an electric field generated from a side portion of the pixel on a left side infiltrates the gap D portion of the pixel on a right side, acts on liquid crystal and hence, possibility that an abnormal domain is generated is large compared to the embodiment 1. This is because that the pixel electrodes 110 which generates the oblique electric field in a plan view face each other under the point to point relationship in the embodiment 1, the pixel electrodes 110 face each other under a point to line relationship. In FIG. 11, one example of generated line of electric force is indicated by an arrow. Due to such lines of electric force, a drawback on color mixing arises more or less compared to the embodiment 1. However, provided that color mixing is within an allowable range in practical use, the arrangement of the pixels does not cause any problem. Further, when necessary, a width of the light blocking film 201 or the video signal line 1041 may be partially increased thus shielding a portion of the gap D where an oblique electric field is generated from light.

Also in this embodiment, upper and lower boundaries of the pixel in the longitudinal direction are not defined by the scanning lines 1011 or the capacitive lines and hence, the pixel including upper and lower ends can be used for the formation of the pixel whereby it is possible to realize the liquid crystal display device which exhibits high transmissivity, that is, high brightness.

The video signal line 1041 is formed between two pixels on a left side and two pixels on a right side and hence, this portion does not contribute to the formation of an image. On the other hand, since this portion does not contribute to a display, even when the alignment of the liquid crystal molecules 113 become irregular, color purity or contrast of the image is not influenced in the same manner as the embodiment 1. Further, when an electric field is generated on an alignment axis (in the lateral direction) of liquid crystal, liquid crystal molecules 113 are not driven in the same manner as the embodiment 1.

As shown in FIG. 10, a profile of each pixel has a laterally extending trapezoidal shape. In FIG. 10, slits 112 are formed along sides of the trapezoidal shape. In other words, the comb-teeth-shaped pixel electrode 110 is formed with the same inclination as the sides of the trapezoidal shape. Accordingly, the inclination of the pixel electrode 100 is set opposite to each other between an upper half portion and a lower half portion of the pixel electrode 110. Accordingly, directivity of viewing angle can be eliminated.

On the other hand, the inclination of the pixel electrode 110 is set opposite to each other between an upper side and a lower side of the pixel electrode 110 and hence, a triangular region which does not contribute to an image is formed at the center of the pixel in the longitudinal direction. Accordingly, by allowing the scanning line 1011 to extend over such a portion, the reduction of transmissivity is prevented as the whole pixel in the same manner as the embodiment 1.

What is claimed is:

1. A liquid crystal display device comprising:
   a TFT substrate on which electrodes for driving liquid crystal are formed;
   a counter substrate on which color filters are formed; and
   liquid crystal which is sandwiched between the TFT substrate and the counter substrate, wherein
   first planar electrodes, an insulation film which covers the first electrodes, and second electrodes which are formed on the insulation film and have a laterally-extending trapezoidal profile including a comb-teeth shaped electrode are formed on the TFT substrate,
   the liquid crystal is driven by an electric field generated based on potential difference between the first electrode and the second electrode,
   the second electrodes are arranged by alternately reversing the direction of the trapezoidal shape in the longitudinal direction, and the second electrodes are arranged by alternately reversing the direction of the trapezoidal shape in the lateral direction,
   the direction of the comb-teeth-shaped electrode is inclined in a specified direction on an upper portion of the trapezoidal shape and is inclined in the direction opposite to the specified direction on a lower portion of the trapezoidal shape,
   an alignment axis of the liquid crystal on the TFT substrate is arranged equal to the lateral direction,
   the color filters are formed on the counter substrate in a stripe shape in the longitudinal direction, and
   first light blocking films are formed on boundary portions of the color filter on the counter substrate in a stripe shape in the longitudinal direction.

2. A liquid crystal display device according to claim 1, wherein the scanning line extends over a center portion of the second electrode in the lateral direction.

3. A liquid crystal display device according to claim 2, wherein the scanning line extends over the center portion of the second electrode linearly in the lateral direction.

4. A liquid crystal display device according to claim 1, wherein the counter substrate includes second light blocking films which extend in the lateral direction and overlap with thin film transistors formed on the TFT substrate, and at least some second light blocking films are configured to prevent bridging of the neighboring first light blocking films.

5. A liquid crystal display device according to claim 1, wherein the spacers are provided for defining a gap between the TFT substrate and the counter substrate, and the spacers has a longitudinal direction thereof in the lateral direction.

6. A liquid crystal display device according to claim 5, wherein the counter substrate includes second light blocking films which extend in the lateral direction and overlap with thin film transistors formed on the TFT substrate, the some second light blocking films are configured to prevent bridging of the neighboring first light blocking films, and
   the spacers are formed on some other second light blocking films, and the second light blocking films on which the spacers are formed bridge the neighboring first light blocking films.

7. A liquid crystal display device according to claim 1, wherein on the TFT substrate and the counter substrate, a layer which blocks light is not formed between the two second electrodes arranged adjacent to each other in the longitudinal direction.

8. A liquid crystal display device according to claim 1, wherein the second electrode is a pixel electrode and the first electrode is a common electrode.

9. A liquid crystal display device comprising:
   a TFT substrate on which electrodes for driving liquid crystal are formed;
   a counter substrate on which color filters are formed; and
   liquid crystal which is sandwiched between the TFT substrate and the counter substrate, wherein
   first planar electrodes, an insulation film which covers the first electrodes, and second electrodes which are formed on the insulation film and have a laterally-extending trapezoidal profile including a comb-teeth shaped electrode are formed on the TFT substrate, the liquid crystal is driven by an electric field generated based on potential difference between the first electrode and the second electrode, the second electrodes are arranged by alternately reversing the direction of the trapezoidal shape in the longitudinal direction, and the second electrodes are arranged without alternately reversing the direction of the trapezoidal shape in the lateral direction, the direction of the comb-teeth-shaped electrode is inclined in a specified direction on an upper portion of the trapezoidal shape and is inclined in the direction opposite to the specified direction on a lower portion of the trapezoidal shape, an alignment axis of the liquid crystal on the TFT substrate is arranged equal to the lateral direction, the color filters are formed on the counter substrate in a stripe shape in the longitudinal direction, and first light blocking films are formed on boundary portions of the color filter on the counter substrate in a stripe shape in the longitudinal direction.

10. A liquid crystal display device according to claim 9, wherein the scanning line extends over a center portion of the second electrode in the lateral direction.

11. A liquid crystal display device according to claim 10, wherein the scanning line extends over the center portion of the second electrode linearly in the lateral direction.

12. A liquid crystal display device according to claim 9, wherein the counter substrate includes second light blocking films which extend in the lateral direction and overlap with thin film transistors formed on the TFT substrate, and at least some second light blocking films are configured to prevent bridging of the neighboring first light blocking films.

13. A liquid crystal display device according to claim 9, wherein the spacers are provided for defining a gap between the TFT substrate and the counter substrate, and the spacers has a longitudinal direction thereof in the lateral direction.

14. A liquid crystal display device according to claim 13, wherein the counter substrate includes second light blocking films which extend in the lateral direction and overlap with thin film transistors formed on the TFT substrate, the some second light blocking films are configured to prevent bridging of the neighboring first light blocking films from bridging, and the spacers are formed on some other second light blocking films, and the second light blocking films on which the spacers are formed bridge the neighboring first light blocking films.

15. A liquid crystal display device according to claim 9, wherein on the TFT substrate and the counter substrate, a layer which blocks light is not formed between the two second electrodes arranged adjacent to each other in the longitudinal direction.

16. A liquid crystal display device according to claim 9, wherein the second electrode is a pixel electrode and the first electrode is a common electrode.

* * * * *

UNITED STATES PATENT AND TRADEMARK OFFICE
CERTIFICATE OF CORRECTION

PATENT NO. : 7,782,426 B2
APPLICATION NO. : 12/289183
DATED : August 24, 2010
INVENTOR(S) : Tanno et al.

Page 1 of 1

It is certified that error appears in the above-identified patent and that said Letters Patent is hereby corrected as shown below:

Title Page;
On the face of the patent, Under Item (73) please amend the Assignee from –IPS Alpha Technology , Ltd., Chiba (JP) and Hitachi Displays, Ltd., Chiba (JP).—to "Hitachi Displays, Ltd., Chiba (JP)"

Signed and Sealed this
Thirteenth Day of September, 2011

David J. Kappos
*Director of the United States Patent and Trademark Office*